United States Patent [19]
Raymond

[11] Patent Number: 5,163,378
[45] Date of Patent: Nov. 17, 1992

[54] BOAT LIFT

[76] Inventor: James W. Raymond, 4052 Southwell Way, Sarasota, Fla. 34241

[21] Appl. No.: 835,123

[22] Filed: Feb. 12, 1992

[51] Int. Cl.⁵ .............................................. B63C 7/00
[52] U.S. Cl. .......................................... 114/44; 405/3
[58] Field of Search ................... 114/44, 49, 344, 365; 405/3, 203; 280/44, 414

[56] References Cited

U.S. PATENT DOCUMENTS 3,753,355  8/1973  Knoch ..................................... 405/3
5,042,417  8/1991  Raymond ........................... 114/344

Primary Examiner—Jesus D. Sotelo
Attorney, Agent, or Firm—Charles J. Prescott

[57] ABSTRACT

A ground supported boat lift including a frame which is pivotally movable about two shorter spaced apart parallel legs connected at each rear corner of the frame from an upright position to a generally horizontal position of the frame. A boat cradle is connected and extends perpendicular between the legs and is raised from being in close proximity to the ground to being above the ground by the legs as the frame is pivoted into a horizontal position. Optional removable wheels and a trailer tongue convert the device to a more conventional boat trailer.

12 Claims, 2 Drawing Sheets

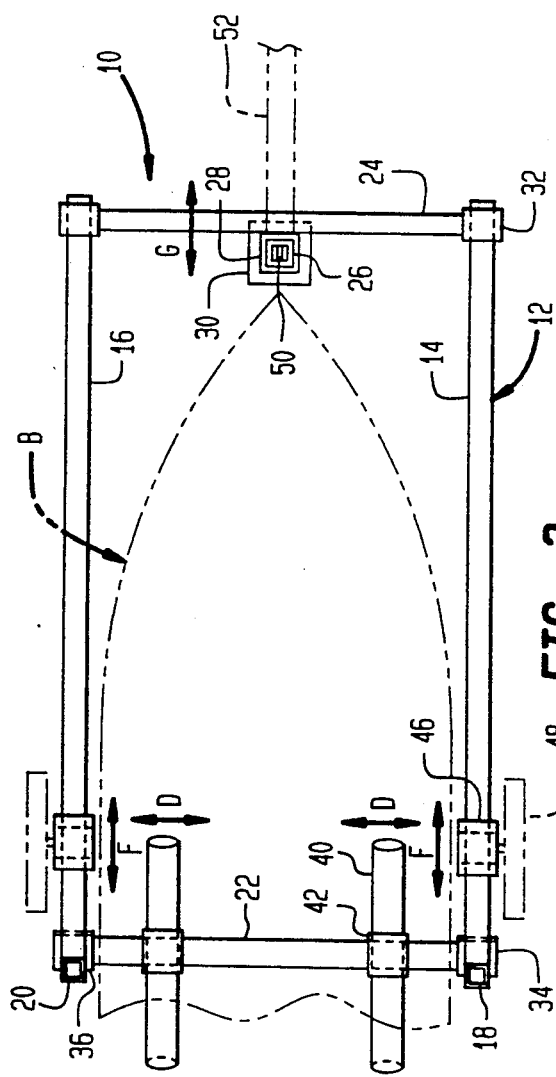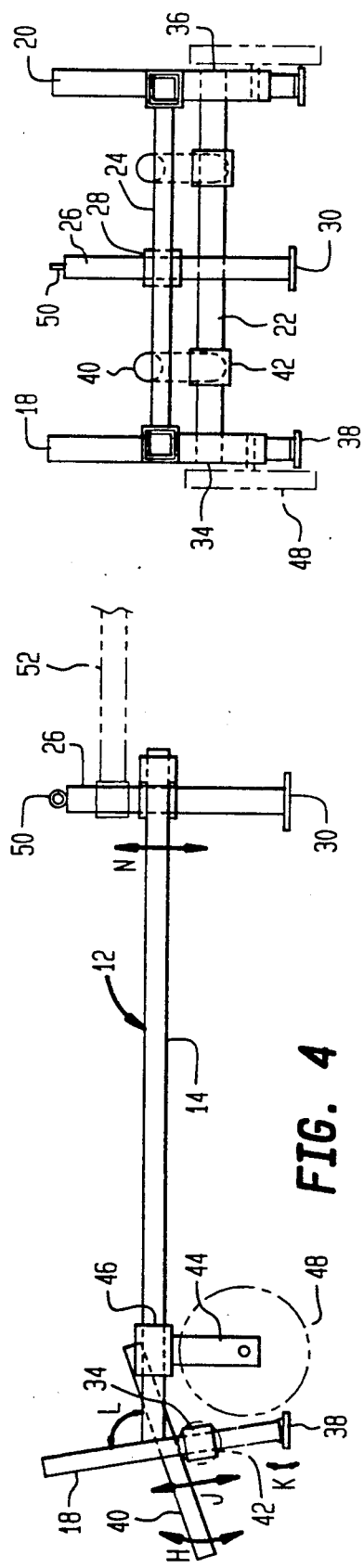

BOAT LIFT

BACKGROUND OF THE INVENTION

This invention relates generally to boat lifts, and more particularly to a ground supported boat lift which is structured for use primarily immediately adjacent a body of water and manually operable by a single user.

A wide variety of boat lifts are presently available for removing a boat from water. Some such lifts are of a floatation type while others are ground or water bottom supported.

Typically, the ground or water bottom supported boat lifts are permanently attached and immovable and simply raise or lower the boat from the body of water.

To lift even a small boat and its engine and accessories from water normally requires the application of a power source such as an electric motor, hydraulics, a pneumatic cylinder or the like. This is so because even small boats have a weight of several hundreds and even several thousands of pounds.

For simply lifting a small boat from water immediately adjacent a sloped shoreline, some boat owners utilize a boat trailer for this purpose. After the boat is loaded onto the trailer, the trailer is pulled a short distance out of the water and then left in that position until the next time the boat is used.

The present invention utilizes a unique leverage arrangement and provides a preferably manually operated ground supported boat lift which will conveniently lift a boat from the water and allow it to rest in that position immediately adjacent or at the shoreline. Optionally, this invention may be easily converted to a trailerable or rollable boat lift as well.

BRIEF SUMMARY OF THE INVENTION

This invention is directed to a ground supported boat lift including a frame which is pivotally movable about two shorter spaced apart parallel legs connected generally orthogonally to the frame at each rear corner from an upright position to a generally horizontal position of the frame. A rear crossbar which forms a boat cradle is connected and extends perpendicular between the legs and is raised by leverage from being in close proximity to the ground to being above the ground by the legs as the frame is pivoted into a horizontal position. Optional removable wheels and a trailer tongue convert the device to a more conventional rollable or towable boat trailer.

It is therefore an object of this invention to provide a ground supported boat lift which will easily manually lift the boat from the water when positioned immediately adjacent or at a water shoreline.

It is another object of this invention to provide a boat lift for smaller boats which will facilitate manually lifting the boat from the water and holding it there at the water's edge.

It is yet another object of this invention to provide a boat lift for boats of trailerable size which will easily convert to a rollable and towable boat trailer.

In accordance with these and other objects which will become apparent hereinafter, the instant invention will now be described with reference to the accompanying drawings.

BRIEF DESCRIPTION OF THE DRAWINGS

FIG. 3 is a top plan view of the invention depicting the boat and optional removable wheels in phantom.

FIG. 4 is a side elevation view of FIG. 3.

FIG. 5 is a right end view of FIG. 3.

DETAILED DESCRIPTION OF THE INVENTION

Figure 1:
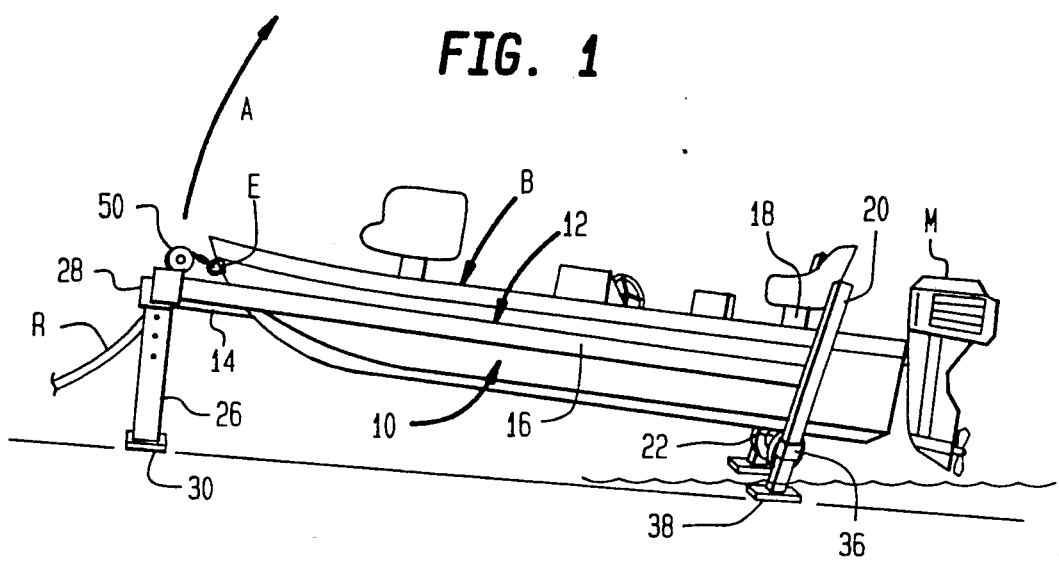
FIG. 1 is a side perspective view of the invention in its horizontal configuration adjacent the water's edge supporting a boat above the ground and water.

Referring now to the drawings, and particularly to FIGS. 3 through 5, the invention is generally shown at numeral 10 and includes a rigid tubular perimeter frame 12 having longitudinal members 14 and 16 held spaced apart by a transverse front crossbar 24 and a rearwardly positioned transverse crossbar 22. Front crossbar 24 is lockably slidable in the direction of arrow G, by collars 32 engaged around longitudinal members 14 and 16. These components are generally coplanar.

Crossbar 22 generally forms a boat cradle for supporting the rear portion of a boat. Crossbar 22 is made lockably slidably connectable in the direction of arrow J by collars 34 and 36 over legs 18 and 20, respectively. As will be understood later, the positioning of these collars 34 and 36 will determine the amount of lift achieved by the device. Elongated bars 40, which are lockably engageable by connected collars 42 around the cylindrical cross section of crossbar 22, pivot in the direction of arrow H in FIG. 4 and are laterally adjustable in the direction of arrow D in FIG. 3 so as to better support the boat hull.

Rigidly connected at the rearward end of each longitudinal frame member 14 and 16 are legs 18 and 20, respectively. These legs 18 and 20 are connected generally at a mid point thereof and are oriented perpendicular to rear crossbar 22 and, as seen in FIG. 4, at an angle L with respect to the plane defined by longitudinal members 14 and 16. This angle L is preferably about 100 degrees. Ground engaging pads 38 are pivotally connected at the lower ends of legs 18 and 20 for articulation in the direction of arrow K in FIG. 4.

A frame front support member 26 is also provided and made movably positionable as seen in FIG. 4 in the direction of arrow N with respect to frame 12 within collar 28 rigidly connected to the mid point of front crossbar 24. An enlarged ground engaging pad 30 is provided at the lower end of this front frame support 26.

Referring additionally now to FIG. 1, the invention 10 is there shown in a horizontal orientation wherein the boat B with a motor M attached thereto is supported atop rear crossbar 22 above the water by legs 18 and 20. Again, enlarged pads 38 help prevent legs 18 and 20 from sinking into the ground. Front support member 26 supports the front of frame 12 above the ground, along with the bow of the boat B which has been rigidly secured to anchor 50 via boat eyelet E, anchor 50 being rigidly connected at the end of front frame support 26.

Figure 2:
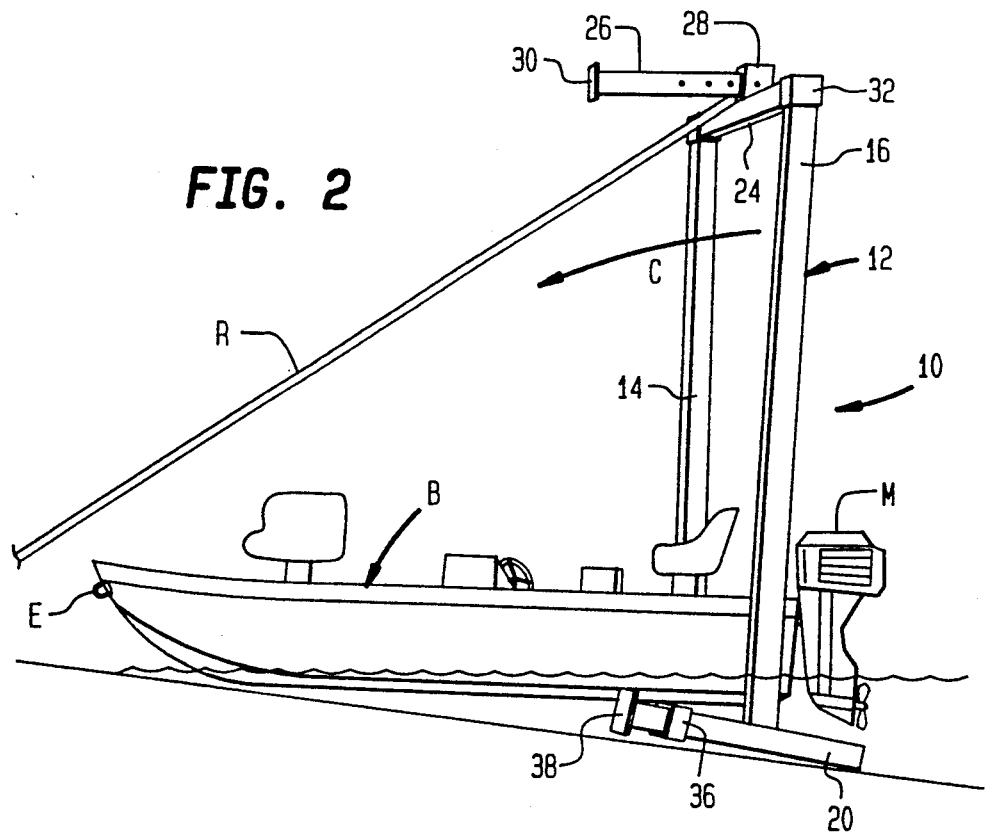
FIG. 2 is a side perspective of the invention in its upright configuration wherein a boat is in a lowered position having just been onloaded or ready for offloading into the water.

Referring additionally to FIG. 2, to position the boat B into the water, rope R connected to front crossbar 24, having been anchored to the ground or ground anchor, is released and the front end of frame 12 is manually pushed upwardly in the direction of arrow A. The device 10 then takes the position shown in FIG. 2 wherein frame 12 is generally upright and legs 18 and 20 are against the ground. By this pivotal, leveraged movement about the lower end of legs 18 and 20, the rear crossbar 22 and boat cradles 40 are lowered.

In the configuration shown in FIG. 2, the boat B and its motor M may then easily be launched into the water or, alternately, removed therefrom. Reversing the process so as to elevate the boat for storage above the water, the rope R is either pulled or manually winched so that frame 12 pivots about legs 18 and 20 in the direction of arrow C back into the orientation shown in FIG. 1.

Referring again to FIGS. 3, 4 and 5, optional removable wheels 48, (in phantom) connectable to brackets 44, having rigidly connected slidable collars 46, are also provided. Brackets 44 are sized so that the removable wheels 48 shown in phantom will contact the ground as the frame 12 is pivoted in the direction of arrow C in FIG. 2 into the stored upright position shown in FIG. 1. Thus, when wheels 48 are installed as frame 12 is upright, as the device 10 is moved to its horizontal position, legs 18 and 20 and their pivotally connected support pads 38 are lifted from the ground by wheels 48. By this arrangement, the entire device 10 may be rolled away from the water's edge.

If desired, an optional trailer tongue 52 shown in phantom in FIGS. 3 and 4 may be connected over front support member 26 so that the entire boat lift 10, with our without a boat thereatop, may be connected to a trailer hitch on a vehicle for towing.

In the preferred embodiment, legs 18 and 20 are oriented in the side elevation view shown in FIG. 4 at the angle L of approximately 100 degrees with respect to side members 14 and 16. This is provided to accommodate a sloped shoreline as shown particularly in FIG. 2 so that the frame 12 will be in a generally upright orientation when legs 18 and 20 rest flat atop the sloped shoreline. Additionally, as seen in FIG. 1, this orientation provides a slight tendency for the frame 12 to move upwardly in the direction of arrow A so as to reduce the manual effort in launching the boat B.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A ground supported boat lift comprising:
   an elongated frame including two spaced apart, parallel legs connected to one end of said frame at a mid point of each said leg, said legs generally upright when said frame is in a generally horizontal position;
   a boat cradle connected between said legs for supporting a rearward portion of a boat thereatop;
   said legs cooperatively structured with said frame to elevate said cradle above the ground when said frame is pivoted about said legs to a generally horizontal position with only one end of said legs then in contact with the ground;
   said legs cooperatively structured with said frame to lower said cradle in close proximity to the ground when said frame is pivoted about said legs to a generally upright position with said legs generally in contact with the ground over their entire length.

2. A boat lift as set forth in claim 1, further comprising:
   removable wheel means connected to said frame adjacent said cradle for rollable ground engagement and greater elevation of said cradle above the ground whereby said legs are above the ground when said frame is pivoted to the generally horizontal position.

3. A boat lift as set forth in claim 2, further comprising:
   a removable trailer tongue connectable at one end to a front end of said frame and connectable to the opposite end to a trailer hitch of a vehicle.

4. A boat lift as set forth in claim 1, further comprising:
   a front ground engaging member connectable generally perpendicular to a front end of said frame and structured to support said frame front end above the ground when said frame is pivoted to the generally horizontal position.

5. A boat lift as set forth in claim 1, wherein:
   said legs are connected at a rearwardly inclined angle of greater than 90 degrees with respect to the length of said frame.

6. A boat lift as set forth in claim 1, further comprising:
   a pull and lock cord connected at one end to a front end of said frame whereby a user may pull said frame from its upright orientation to its generally horizontal position.

7. A ground supported boat lift comprising:
   an elongated, parallel frame including two spaced apart longitudinal members having a front and a rear crossbar connected between the corresponding ends of each said longitudinal member, said rear crossbar forming a boat cradle for supporting the rearward portion of a boat;
   an elongated support leg connected at a mid point thereof to each end of said rear crossbar, each said leg structurally oriented generally perpendicular to said rear crossbar and generally orthogonally to said longitudinal members;
   said legs cooperatively structured with said frame to elevate said cradle above the ground when said frame is pivoted about said legs to a generally horizontal position with only one end of said legs then in contact with the ground;
   said legs cooperatively structured with said frame to lower said cradle in close proximity to the ground when said frame is pivoted about said legs to a generally upright position with said legs generally in contact with the ground over their entire length.

8. A boat lift as set forth in claim 7, further comprising:
   removable wheel means connected to said frame adjacent said rear crossbar for ground engagement and greater elevation of said rear crossbar above the ground whereby said legs are above the ground when said frame is pivoted to the generally horizontal position.

9. A boat lift as set forth in claim 8, further comprising:
   a removable trailer hitch tongue connectable at a mid point of said front crossbar and connectable to the opposite end to a trailer hitch of a vehicle.

10. A boat lift as set forth in claim 7, further comprising:
   a front ground engaging member connectable generally perpendicular to said front crossbar and structured to support said frame front end above the ground when said frame is pivoted to the generally horizontal position.

11. A boat lift as set forth in claim 7, wherein: said legs are connected at a rearwardly inclined angle of about 80 degrees with respect to the length of said frame.

12. A boat lift as set forth in claim 7, further comprising:
   a pull and lock cord connected at one end to a front end of said frame whereby a user on foot may pull said frame from its upright orientation to its generally horizontal position.

* * * * *